United States Patent [19]

Shields

[11] Patent Number: 4,986,410
[45] Date of Patent: Jan. 22, 1991

[54] MACHINE CONTROL APPARATUS USING WIRE CAPACITANCE SENSOR

[76] Inventor: Winston E. Shields, 8612 W. 127th St., Palos Park, Ill. 60464

[21] Appl. No.: 384,038

[22] Filed: Jul. 24, 1989

Related U.S. Application Data

[62] Division of Ser. No. 162,755, Mar. 1, 1988, Pat. No. 4,871,058.

[51] Int. Cl.$^5$ .............................................. B65G 43/00
[52] U.S. Cl. .................................... 198/444; 318/662; 324/664; 198/572
[58] Field of Search .................. 198/444, 502.1, 502.2, 198/524, 460, 572, 573; 318/662, 652, 656; 324/130, 61 R

[56] References Cited

U.S. PATENT DOCUMENTS

| 4,410,078 | 10/1983 | Shields et al. | 198/444 X |
| 4,567,410 | 1/1986 | Martin et al. | 198/524 X |
| 4,729,105 | 3/1988 | Thompson et al. | 198/572 X |

Primary Examiner—H. Grant Skaggs
Assistant Examiner—D. Glenn Dayoan
Attorney, Agent, or Firm—Emrich & Dithmar

[57] ABSTRACT

A system for controlling the operating speed of a can machine having an input conveyor for temporarily storing cans while moving them along a path toward the machine includes a metal wire capacitance sensor. The wire may be formed in a repeating pattern and serve as an area mass sensor. The capacitance formed by the sensor wire and the can is connected in a capacitance bridge circuit which is excited by an oscillator. A detector circuit coupled to the bridge circuit generates an output signal representative of the number of cans in the conveyor. Output drive circuitry including an optical coupler for isolating the detection circuitry from the machine under control, transmits a signal for a desired control function to a remotely located variable speed drive controller for controlling either the machine to which the cans are being fed or a machine which is feeding the cans to keep the size of the can queue at a desired value.

14 Claims, 5 Drawing Sheets

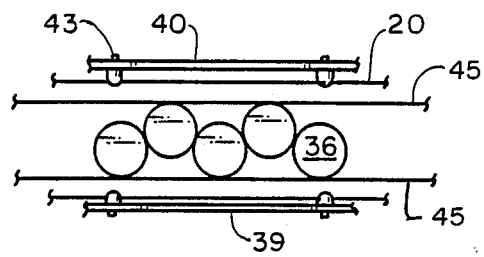
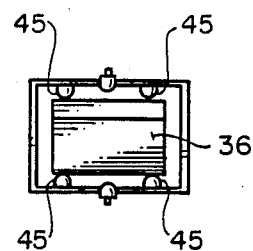
FIG. 3  FIG. 4
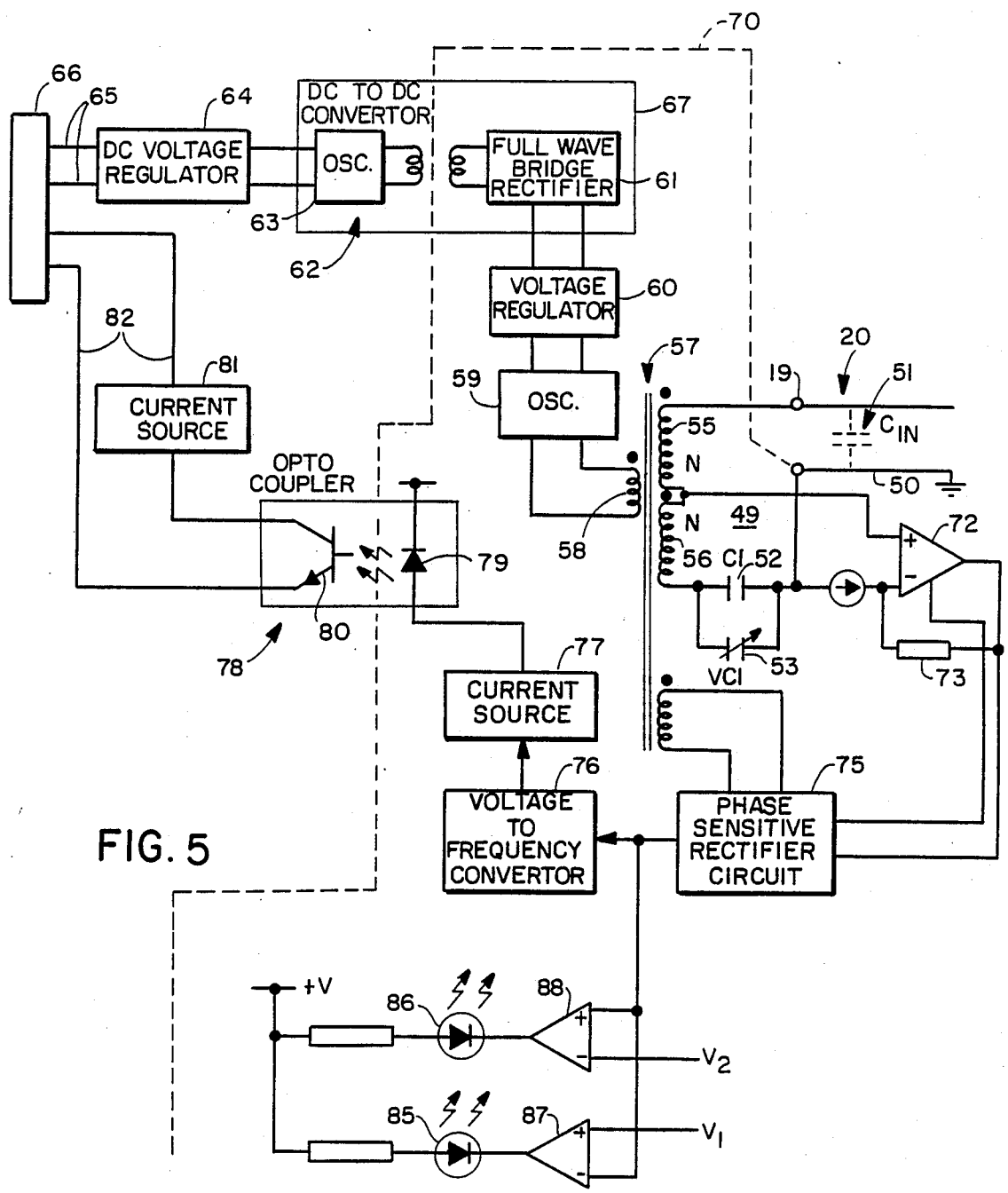
FIG. 5

4,986,410

MACHINE CONTROL APPARATUS USING WIRE CAPACITANCE SENSOR

RELATED APPLICATION

This is a divisional application of co-pending application Ser. No. 07/162,755, filed Mar. 1, 1988 now U.S. Pat. No. 4,871,058 for machine control apparatus using wire capacitance sensor.

BACKGROUND OF THE INVENTION

The present invention relates to a control system for controlling the operating speed of a can machine. As used herein, a "can machine" is a machine for receiving cans or empty can shells without tops for filling the cans, applying a top and sealing it, or labeling the can. In an automated can production line, a number of machines are arranged to perform sequential operations on the cans which are normally conveyed from one machine to another along a conveyor. If the upstream machine is processing cans faster than a downstream machine is capable of processing the cans, there will be a net build-up of cans in the conveyor. Similarly, if the downstream machine processes cans faster than an upstream machine is capable of producing them, the downstream machine will quickly begin to have "misses", thereby reducing efficiency.

It has long been a practice to sense cans in a queue, such as a single file queue and to speed up the downstream machine or slow down the upstream machine if the cans are accumulating in number in the queue or, conversely, to slow down the downstream machine or speed up the upstream machine if the number of cans in the queue is diminishing.

The sensing may be done mechanically, with feelers and limit switches, or it may be done electrically. A typical electrical system for sensing the number of cans in a single file queue is to provide a plurality of proximity sensors along the input conveyor in which the queue is formed. For example, proximity sensors may be located at six inches, twelve inches, eighteen inches, and twenty-four inches from the input of a machine. If there are enough cans only to fill the conveyor up to the nearest sensor, then only that sensor generates a signal to control logic circuitry for performing a speed control function. If the two nearest sensors have cans adjacent them, then separate signals are transmitted to the controller for performing a speed control function, and so on. This type of sensing is acceptable, in some cases, but it does not provide a single signal representative of the total number of cans in the queue. If such a signal were provided, it would have the advantage of permitting a more continuous range of control of the variable speed controllers for the machines. Such variable speed controllers are well-known and capable of operating in response to much smaller increments of signal change than are permitted by the discrete sensors mentioned above.

Moreover, in the case of a conveyor having room to permit more than a single file of cans, the problems of sensing the total mass of cans present and providing finer control increments is even more difficult with existing commercial techniques.

SUMMARY OF THE PRESENT INVENTION

According to the present invention, in the case of a single file conveyor queue, a sensor wire is extended along the conveyor in the direction of travel of the cans, preferable on both sides of the cans. The sensor wire is mounted by means of insulating spacers or guides at a fixed distance from the metal frame of the conveyor. With no cans present, the wire and frame form a fixed capacitance. As the number of cans adjacent the wire increases, the effective capacitance between the wire and frame/cans also increases. This is referred to as the "input" capacitance. The value of the input capacitance is measured by a capacitance bridge circuit which is excited by an oscillator. An output signal is generated representative of the number of cans in the conveyor queue. It will be appreciated that this signal is not representative of a discrete number of cans, but, in effect, is an analog signal representative of the input capacitance which, in turn, is a function of the total surface area of cans present in the conveyor relative to the location of the sensor wire. Theoretically, the output signal thus is a signal representative of the total number of cans fully within the sensing range of the input wire and any fraction of a can entering and/or leaving the conveyor adjacent the sensor wire.

By thus generating a signal which is a more accurate analog of the total effective area of cans in the queue, the variable speed controller (whether it is associated with a downstream machine or an upstream machine) may be more effectively controlled so as to reduce large swings or variations in the number of cans in the queue, thereby providing a smoother control function.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIG. 3 is a top fragmentary view of the central portion of the single file conveyor of FIG. 2;

FIG. 4 is an end view of the conveyor of FIG. 2;

FIG. 5 is a circuit schematic diagram of the detecting circuitry of FIG. 1;

DETAILED DESCRIPTION OF A PREFERRED EMBODIMENT

Figure 1:
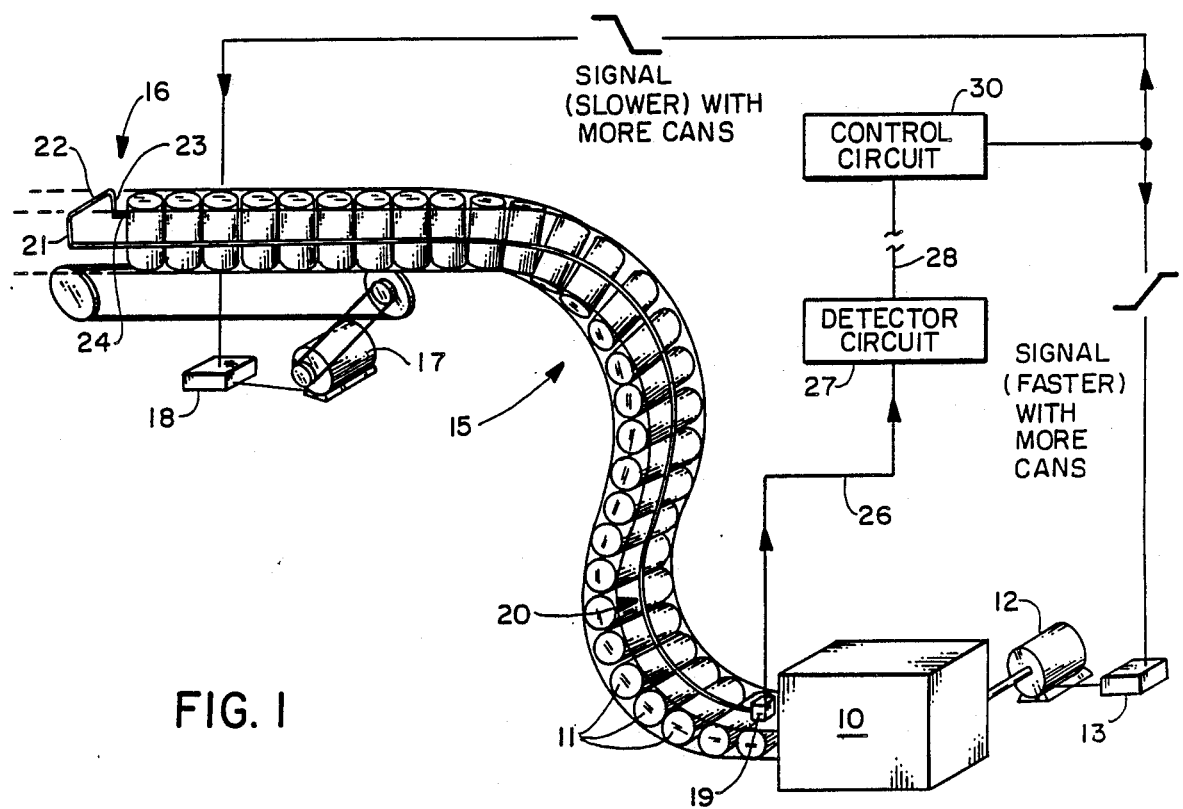
FIG. 1 is an overall diagrammatic view of a control system for a can machine incorporating the present invention.

Referring first to FIG. 1, a can machine is diagrammatically represented at 10. The can machine 10 may be of conventional design; and, as is well-known in the art, it may be used to perform any one of a number of processes on incoming cans such as those designated at 11. Such processes may include filling, sealing, labeling or the like. The can machine 10 is driven by a motor 12 which, in turn, is controlled by a variable speed drive 13, which is also of conventional design.

The cans 11, as illustrated, are of conventional shape, with cylindrical walls and flat tops and bottoms. The cans 11 are fed along a single-file track conveyor generally designated 15 which, in the illustrated embodiment, receives the cans at an inlet area generally designated 16 with the axes defined by the cylindrical side walls of the cans extending in a generally vertical direction. The conveyor 15 is formed such that the cans are gravity fed to the can machine 10 and twisted in transit such that their axes extend horizontally at the input of the can machine 10. This is not the only application, i.e. machines may be fed by other means such as air conveyors, cables driven conveyors, etc.

The conveyor 15 is driven by a motor 17 which, in the illustrated embodiment, is controlled by a variable speed drive 18.

While not shown in FIG. 1 for clarity, the conveyor 15, whether it is a belt type conveyor or an air conveyor, has a metal frame. In the prior art method of detecting the quantity of cans in the single file queue on conveyor 15 described above, a number of proximity sensors comprising primarily a metal plate forming a static capacitor with the frame of the machine, were placed at predetermined distances along the conveyor 15. When a can or a number of cans were near a given sensor, the capacity associated with that sensor increased, and by placing discrete proximity sensors along the length of the conveyor, and providing circuitry for sensing the capacitance at each proximity sensor, a determination was made in electrical circuitry as to the length of the queue.

According to the present invention, a single sensing capacitor providing an input capacitance is formed. In the embodiment illustrated in FIG. 1, the sensor wire is generally designated 20. It extends from a connector block 19 adjacent the inlet of the can machine 10 along one side of the conveyor at the approximate mid-point of the axial length (i.e., the height) of the can. The wire is turned upwardly to form a vertical section 21 and crosses over the top of the cans by means of a transverse section 22 and is then turned downwardly again at 23 and extends along the other side of the line of cans as partially seen at 24. The portion 24 of the sensing wire 20 extends along the other side of the cans parallel to the segment 20 and terminates just short of the inlet of the can machine 10. If the in feed is long enough to generate a sufficiently strong signal, the wire 20 may be strung on one side only.

The wire 20 is connected at terminal block 19 to a conductor 26 which preferably may be the center conductor of a coaxial cable which couples the wire 20 electrically to the input of a detector circuit diagrammatically represented by the block 27. The detector circuit 27 includes a capacitance bridge which will be described in greater detail below, and generates an output signal on a line 28 which is representative of the value of the capacitance sensed on the wire 20, and thus representative of the number of cans in the line on conveyor 15. The output signal of the detector circuit 27 may be a low frequency signal which is fed to a remotely located control circuit 30.

The control circuit 30 may be of conventional design. The control circuit 30 generates a control signal depending upon the application. If it is desired to control an upstream machine such as the conveyor motor 17, then the control signal from the control circuit 30 generates a signal to variable speed drive 18 which will slow down the motor 17 as the signal from the detector circuit 28 indicates an increasing number of cans on conveyor 15. Conversely, if it is desired to control the can machine 10, then the control circuit 30 generates a signal to the variable speed controller 13 which causes the motor 12 to increase in speed as a greater number of cans is sensed in the conveyor 15.

The control circuit 30 and the machine being controlled by it may be located a substantial distance from the detector circuit 27 which preferably is located within a few inches of the end of the sensor wire 20. Thus, there can exist a substantial difference in ground potential between the earth ground of the frame of conveyor 15 and the earth ground of the machine being controlled. This difference in ground potential is exacerbated considering the nature of the environment in which the machines work. That is, there normally is a substantial amount of electrical "noise" in and around the machinery of a can factory because of the motors, controls, etc. which are used. Any such "noise" or difference in ground potential can greatly effect the sensitivity of the detector circuit 27 and care must be taken to protect against differences in ground potential, as will be described.

Figure 2:
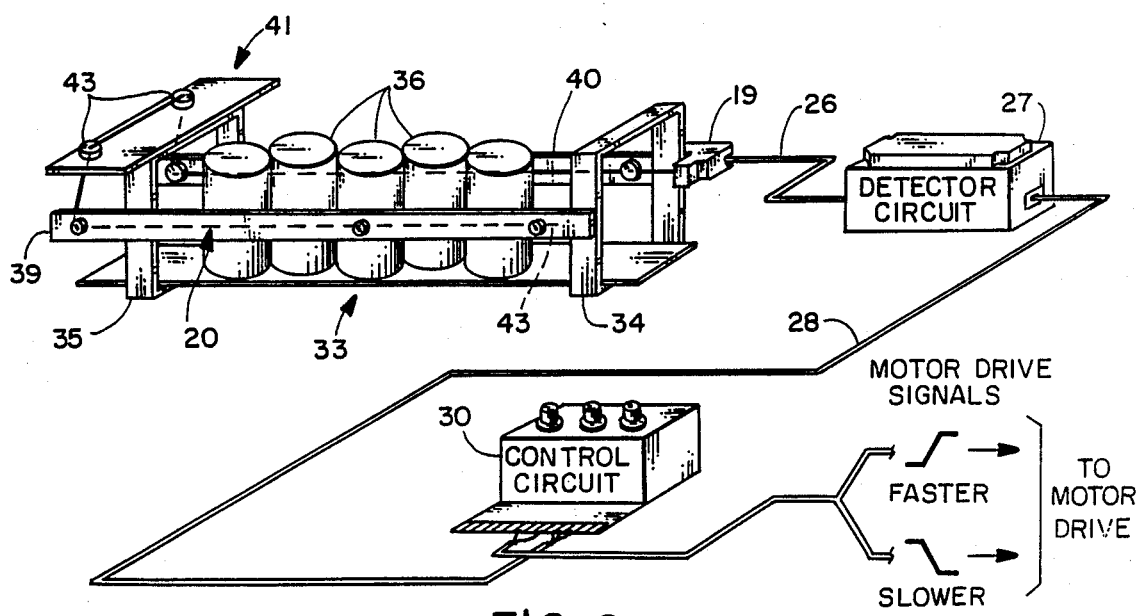
FIG. 2 is a view, partly in diagrammatic form, showing a single file conveyor incorporating the present invention with the various components shown in perspective view.

Turning now to FIG. 2, there is shown a short section of conveyor track generally designated by reference numeral 33. The cans shown in FIG. 2 may be thought of as moving from left to right along the conveyor section 33.

The conveyor section 33 shown in FIG. 2 is shortened from that which would occur in a practical application for purposes of brevity. Spaced along the conveyor section 33 are rectangular brackets 34, 35 made of bar stock and sized so as to permit the cans 36 to move between them on the conveyor belt 38.

A pair of wire guide rails 39, 40 extend between the brackets 34, 35 for mounting and spacing the sensor wire which again generally designated by reference numeral 20. A crossover assembly generally designated 41 is mounted to the top of the bracket 35 for supporting the wire as it crosses from one side of the conveyor to the other. The wire 20 is mounted on the inside of the rails 39, 41 adjacent the cans 36, and it is supported and spaced from the rails by insulating spacers such as those designated 43 in FIG. 3.

The cans 36 are prevented from contacting the sensor wire 20 by means of upper and lower guide rails which are designated 45 in FIG. 4 but which are not shown in FIG. 2 for clarity of the other details.

The far end of the sensor wire 20 is connected to a connector block 19 which, as described, is coupled to the detector circuit 27 by means of a short length of conductor 26, which preferably is coaxial cable.

Turning now to FIG. 5, there is shown a circuit schematic diagram, partly in functional block form, of a detector circuit for generating a signal representative of the number of cans in the queue on conveyor 33. Again, the sensor wire is generally designated 20, and it is connected via terminal block 19 to form one leg of a capacitance bridge generally designated 49. The capacitance between the sensor wire and the frame work of the conveyor (diagrammatically represented by reference numeral 50) is represented by the dashed capacitance 51 which is referred to as the "input" capacitance. When cans are present, the input capacitance increases in value proportional to the number of cans which are present.

The reference capacitance leg of the bridge circuit 49 is formed from a fixed capacitance 52 and a variable capacitance 53. The other two branches of the bridge circuit 49 are formed by the secondary windings 55, 56 of an isolating transformer 57. The primary winding 58 of the transformer 57 is fed by a conventional oscillator circuit 59 which, in turn, receives power from a voltage regulator 60 which is fed by a conventional full wave bridge rectifier circuit 61. The bridge rectifier 61, in turn, is energized by a transformer 62 which is driven by a conventional oscillator circuit 63 fed from a DC voltage regulator 64. The DC voltage regulator 64 receives power from a conventional DC power supply fed along the lines 65 coupled to the circuitry by means of a connector 66. The oscillator 63, transformer 62 and full wave rectifier bridge circuit 61 form a conventional DC to DC convertor circuit enclosed within the block 67. An important advantage of the DC to DC convertor circuit shown with transformer 62 is that it provides electrical isolation between the framework associated with the assembly line being monitored and the equipment being controlled, which may be remotely located at distances up to hundreds of feet. The conventional DC power voltage along input line 62 may be received, of course, from a remote location, but the DC to DC convertor 67 achieves isolation of earth grounds by grounding the transformer 62 to the framework of the conveyor being monitored as diagrammatically illustrated by the dashed line 70.

The output of the capacitance bridge 49 is coupled to an operational amplifier 72 which is provided with negative feedback represented by the resistor 73 to form a current to voltage convertor.

As the number of cans in the input conveyor increases, the effective value of the input capacitance 51 will also increase, thereby proportionately increasing the current flow into the input capacitance, 51, circuitry. Since the current flow into the reference capacitors 52 and 53, is constant, this increase in current flow will be directly coupled to the inverting input of the operational amplifier 72, so the output signal is a signal which increases in amplitude proportional to the input capacitance associated with sensing wire 20. The output signal of the operational amplifier 72 is coupled to a phase-sensitive rectifier circuit 75 which converts the signal to a DC signal proportional to the input capacitance, and thus, to the number of cans in the input conveyor. The output of the phase sensitive rectifier circuit 75 is coupled to a voltage to frequency convertor circuit 76 which, in turn, feeds a current source 77 which drives an optical coupler circuit generally designated 78 and including a photo diode 79 and a photo-sensitive transistor 80 which, in turn, drives a current source 81. The optical coupler 78 provides electrical isolation between the sensing circuitry and the drive signal which is coupled along lines 82 via connector 66 to the machine being controlled, which may be remotely located, as mentioned.

In the illustrated embodiment, the operational amplifier 72 receives the output signal from the capacitor bridge, and the output signal of the operational amplifier 72 is then rectified to a DC voltage in the phase sensitive rectifier circuit 75. Persons skilled in the art will appreciate that the output of the capacitor bridge may equally well be coupled first to a rectifier circuit such as the phase sensitive rectifier circuit 75 and the operational amplifier converting the output signal to a voltage level may then be connected to amplify the already rectified output signal of the rectifier circuit.

In order to facilitate calibration of the detector circuitry of FIG. 5, two light emitting diodes (LEDs) designated 85 and 86 respectively are connected in circuit with the outputs of comparators 87, 88 respectively. The output of the phase sensitive rectifier circuit 75 is connected to the normal input of comparator 88 into the inverting input of comparator 87. The purpose of the indicating LEDs 85, 86 is to establish that when no cans are in the input conveyor (that is, the value of the input capacitance 51 is at a minimum for the operating range), both LEDs 85, 86 will be lit. Reference voltages V1 and V2 are generated from a conventional voltage divider network and coupled respectively to the normal input of comparator 87 and to the inverting input of comparator 88. Reference voltage V1 defines a minimum for a starting voltage range (that is, with no cans in the input conveyor), and reference voltage V2 defines a maximum voltage for the start range with no cans in the input conveyor. By way of example, the normal range of DC voltage for the output of the phase-sensitive rectifier circuit 75 may be from a nominal −8 volts DC (with no cans present) to +10 volts DC (for a conveyor fully loaded with cans). Thus, theoretically, when there are no cans in the input conveyor, the output of the phase sensitive rectifier circuit 75 is at −8 volts DC. In this example, the reference voltage V1 may be −8.3 volts and the reference voltage V2 might be −7.7 volts.

To calibrate the system, with no cans in the input conveyor, the output of the phase sensitive rectifier circuit 75 should nominally be −8.0 volts. If it is, then the output of comparator 87 is a "low" voltage, and the LED 85 is energized to conduct. If during calibration the LED 85 is not illuminated with no cans in the input conveyor, additional capacitance may be added in series with the input capacitance 51. Fine tuning is achieved by adjusting the variable capacitor 53 in the reference leg of the capacitor bridge circuit 49 until the output signal of the phase-sensitive rectifier circuit 75 falls below reference voltage V2 which is a voltage representative of the upper limit of the range of starting voltages. In the example given, if V2 is set at −7.7 volts, and the output of the phase-sensitive rectifier circuit 75 is at −8.0 volts (the nominal value for the range set for starting), then the output of comparator 88 will also be "low", and the LED 86 will be illuminated. When both LEDs 85 and 86 are illuminated, it indicates that the detector circuit is within an acceptable starting range, and this signal will increase proportionally as cans are fed to the input conveyor.

Figure 6:
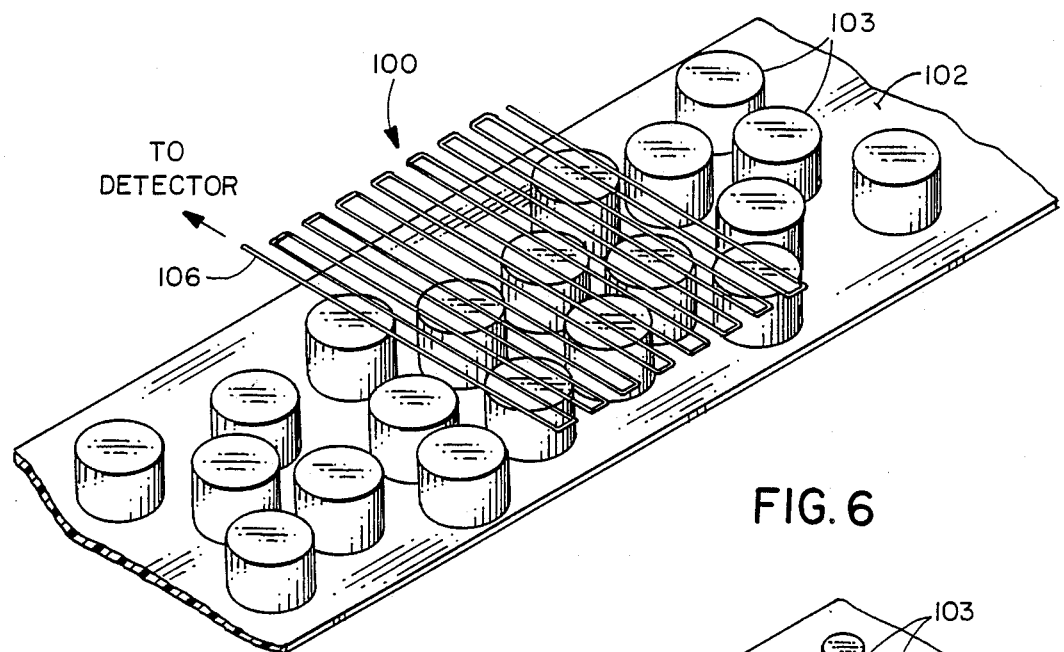
FIG. 6 is a perspective diagrammatic view of a conveyor using an area mass sensor.
Figure 7:
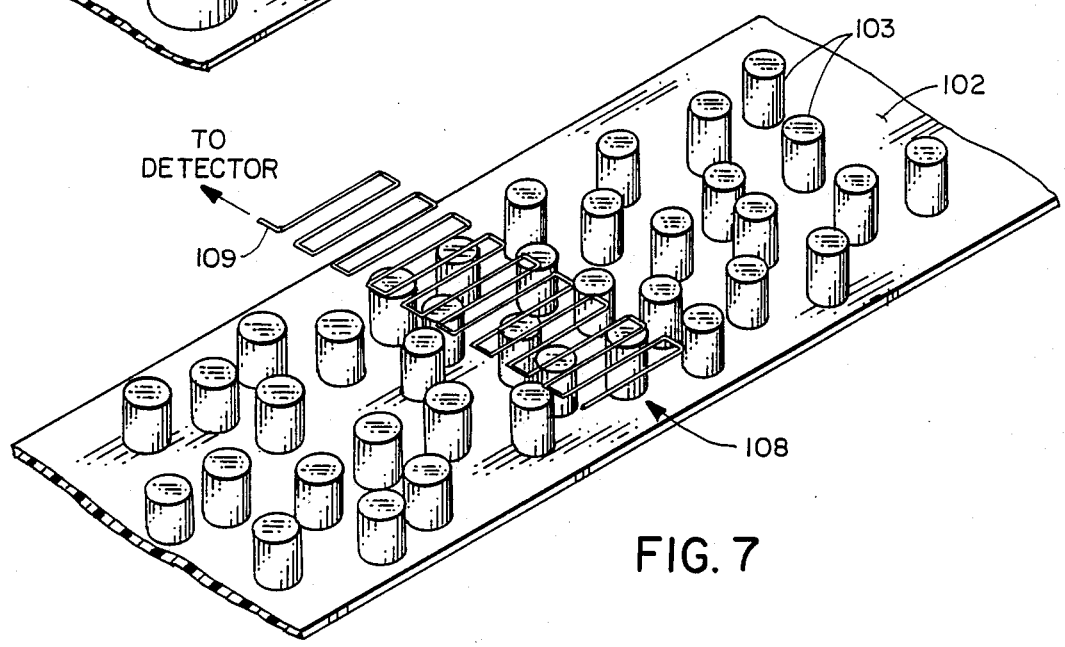
FIG. 7 is a perspective diagrammatic view of an alternate form of area mass sensor for a conveyor.
Figure 8:
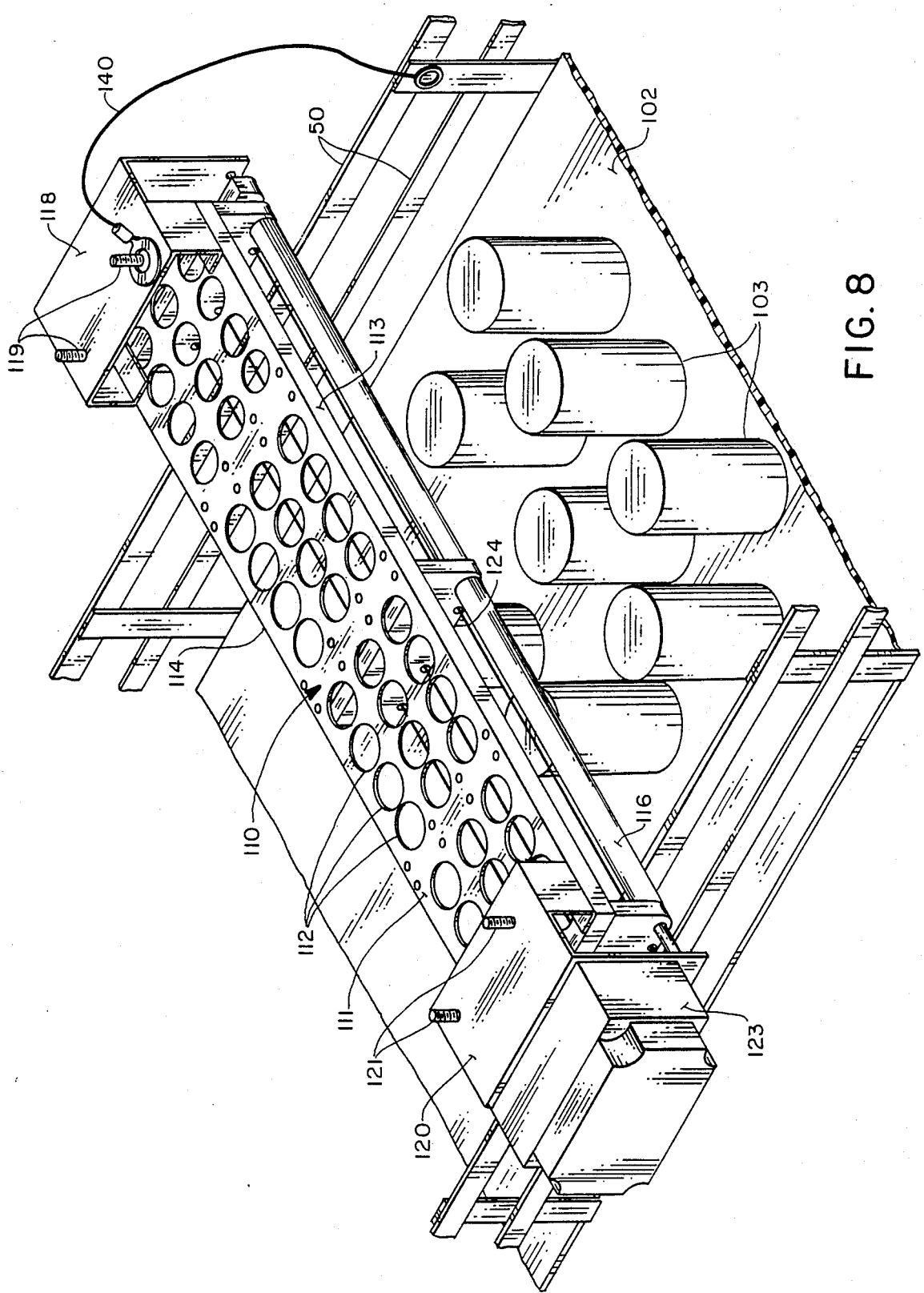
FIG. 8 is a perspective view of an area mass sensor.
Figure 9:
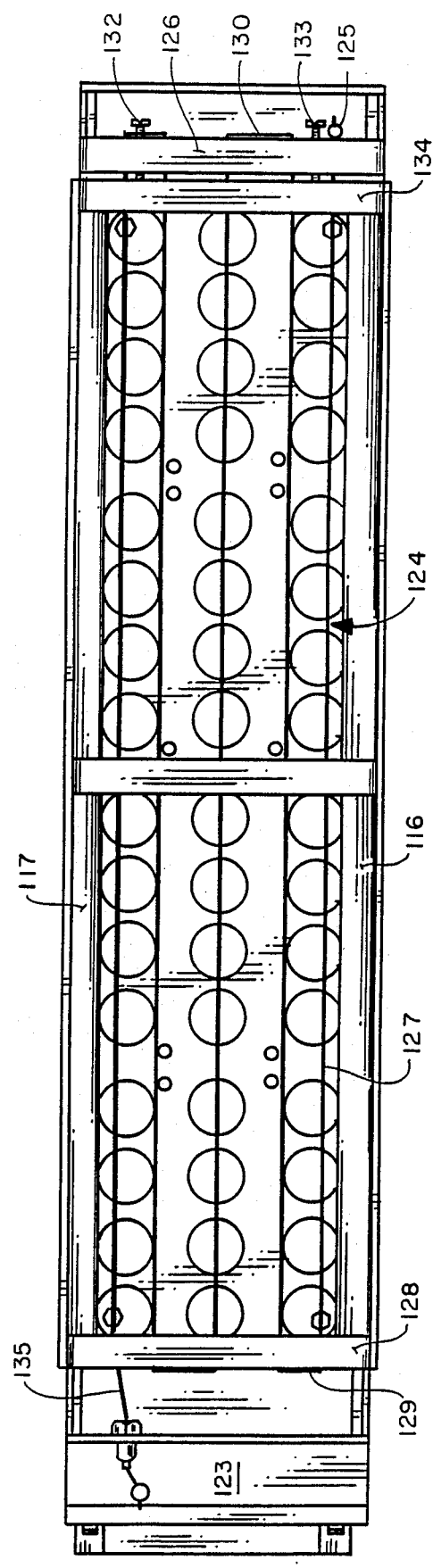
FIG. 9 is a bottom view of the area mass sensor of FIG. 8.

Turning now to FIGS. 8 and 9, there is shown an embodiment for an area mass sensor which may be used with a detector of the type shown in FIG. 5. An area mass sensor, as distinguished from the linear type of sensor described above, is intended to sense cans in a conveyor or buffer zone wherein the cans may accumulate over a width greater than the width of a can so that three or four or even more lines of cans may form, such as are seen in FIGS. 6 and 7. Turning specifically to FIG. 6, the sensor wire generally designated by reference numeral 100 is formed in a repeating square wave pattern starting from a termination 101 and extending in a straight line transversely across the conveyor generally designated 102 on which the cans 103 are transported. The cans may be traveling in either direction in FIG. 6; and they move beneath the sensor wire 100.

After traversing the conveyor area, the wire is turned lengthwise of the conveyor and formed back across the conveyor in a repeating pattern resembling a square wave or Greek key, always maintaining uniformity of spacing and width. The output end of the sensor wire 106 is connected to detector circuitry as described above. Other patterns of wire shape could be used as well, such as triangular, sawtooth or sinusoidal.

In FIG. 7, again the conveyor is designated 102 and the cans transported by their conveyor are designated 103. In this case, the sensor wire is generally designated by reference numeral 108 and is again formed in a square wave pattern except that the pattern progresses across the width of the conveyor to a terminating end 109 which is connected to the detector circuitry.

Turning now to FIGS. 8 and 9, a structure of an area mass sensor generally designated 110 is shown as including an upper metal top plate 111 which is provided with a series of apertures 112. The apertures 112 perform no electronic or sensing function but allow air flow through the sensor for applications in which the cans are conveyed using forced air. The apertured plate 111 is also provided with depending side flanges 113, 114 to provide stiffness and for mounting purposes.

The plate 111 is connected to first and second insulating side rails extending beneath it and designated 116, 117 for structural rigidity. At the right side of the area mass sensor 110, there is a mounting bracket 118 on which mounting studs 119 are fixed; and a similar mounting bracket 120 including mounting studs 121 is provided at the left side of the sensor 110. The detector circuitry may be mounted within the housing 123 attached directly to the end of the sensor.

The sensor wire is designated 124, and referring specifically to FIG. 9, it extends from a knot or bead 125 which is formed adjacent a movable tensioning block 126 along a straight portion 127 and passes through a fixed end block 128 where it is turned as at 129 and then routed back in a square wave pattern by passing through the tension block 126 as at 130. The sensor is thus formed by repeating the pattern. The tension block 126 as well as the fixed end block 128 are formed of polycarbonate material for strength and insulation. The tensioning block 126 is provided with first and second threaded screws 132, 133 which, when turned inwardly of the block 126 bear against a fixed end block 134 and urge the tension block 126 toward the right in FIG. 9, thereby evenly applying tension to the wire 129. A wire or strap 140 is connected between mounting bracket 118 and the frame work or track 50 and completes the ground circuit.

In the illustrated embodiment, the sensor wire 124 forms five different parallel paths, and its terminal end is rigidly secured beneath a butt screw indicated at 135 where it is electrically coupled to the input stage of the detector circuit housed within the housing 123, as indicated earlier.

Having thus disclosed in detail preferred embodiments of the invention, persons skilled in the art will be able to modify certain of the structure which has been disclosed and to substitute equivalent elements for those described while continuing to practice the principle of the invention; and it is, therefore, intended that all such modifications and substitutions be covered as they are embraced within the spirit and scope of the appended claims.

I claim:

1. A sensing element for sensing the presence of cans on a conveyor of a machine wherein the conveyor has a metal frame and has a width sufficient to permit more than one can in side-by-side relation on said conveyor, comprising: an upper metal plate; means for connecting said upper metal plate to said frame of said conveyor above said conveyor while electrically connecting said metal plate to said frame; first and second insulating end blocks beneath said metal plate and on opposite ends thereof; a metal wire arranged beneath said metal plate and extending back and forth between said first and second end blocks in a repeating pattern across the width of said plate and above said cans on said conveyor; and detector circuit means electrically coupled to one end of said wire for detecting the input capacitance formed between said wire and said frame of said conveyor, said input capacitance being increased in proportion to the number of cans on said conveyor beneath said metal plate.

2. The apparatus of claim 1 further comprising means for fixing said first end block relative to said metal plate; and second means for movably mounting said second end block relative to said first end block to tension said wire between said end blocks.

3. The apparatus of claim 2 characterized in that the repeating pattern of said wire across the width of said cover plate is a rectangular pattern.

4. The apparatus of claim 1 wherein said upper metal plate contains a plurality of apertures permitting the passage of air.

5. In a control system for controlling the operating speed of a can machine having an input conveyor with a metal frame for temporarily storing a plurality of cans while moving said cans along a path toward said machine the improvement comprising: a substantially flexible metal sensor wire formed in a winding pattern over a substantial area sufficient to permit a plurality of said cans simultaneously to pass therebeneath; means for mounting said sensor wire physically spaced and electrically isolated from said frame to form an input capacitance with said frame, the value of said input capacitance being modified proportional to the number of cans beneath said sensor wire; circuit means for forming a capacitance bridge circuit having one branch including said input capacitance; oscillator circuit means for exciting said bridge circuit; detector circuit means coupled to said bridge circuit means for generating an output signal representative of the number of cans in said conveyor; and drive circuit means including isolation circuit means receiving said output signal of said detector circuit means for transmitting a control signal to a remotely located variable speed drive controller for a machine to control said controller as a function of the number of cans in said conveyor.

6. The apparatus of claim 5 wherein said wire sensor means comprises an area mass sensor including a sensor wire formed in a repeating pattern and located a fixed distance from cans on said conveyor.

7. The apparatus of claim 6 wherein said sensor wire extends in a repeating pattern across the width of said conveyor.

8. The apparatus of claim 6 wherein said sensor wire extends in a repeating pattern parallel to the direction of travel of said cans along said conveyor.

9. The apparatus of claim 6 further comprising a voltage regulator circuit receiving power from a remote location for regulating DC power; a DC to DC convertor including an isolation transformer for receiving power from said DC voltage regulator for generating a DC power signal coupled to said oscillator circuit means for energizing the same; and isolation circuit means connecting the metal frame of said conveyor to said isolation transformer, whereby said detector circuit means is electrically isolated from its remote power source.

10. The apparatus of claim 9 wherein said isolation circuit means of said drive circuit means includes an optical coupler for electrically isolating said detector circuit means from remote variable speed controller responsive thereto.

11. The apparatus of claim 10 further comprising first and second visual indicators; a first logic circuit responsive to the output of said detector circuit means for energizing said first visual indicator when there are no cans in said conveyor and the output of said detector circuit means is above a first level; and second detector circuit means for energizing said second visual indicator when the output of said detector circuit means is within a predetermined range of voltage relative to said first level, whereby when both of said visual indicators are energized and there are no cans in said conveyor, said bridge and detector circuitry are balanced.

12. The apparatus of claim 11 and further comprising a variable capacitor in said bridge circuit for adjusting the value of the reference capacitance in said bridge circuit equal to the input capacitance with no cans in said conveyor.

13. The apparatus of claim 6 wherein said variable speed controller is associated with the same can machine into which said cans are being fed and sensed, said control signal being transmitted to said variable speed drive controller for increasing the speed of said machine as said detector circuit means indicates that the number of cans in said conveyor increases.

14. The apparatus of claim 13 wherein said variable speed drive controller is associated with apparatus upstream of said can machine for reducing the speed of said upstream apparatus as the number of cans detected in said conveyor increases.

* * * * *